United States Patent
Gayama

(10) Patent No.: US 7,288,710 B2
(45) Date of Patent: Oct. 30, 2007

(54) MUSIC SEARCHING APPARATUS AND METHOD

(75) Inventor: Shinichi Gayama, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 283 days.

(21) Appl. No.: 10/724,902

(22) Filed: Dec. 2, 2003

(65) Prior Publication Data

US 2004/0144238 A1 Jul. 29, 2004

(30) Foreign Application Priority Data

Dec. 4, 2002 (JP) ............................. 2002-352864

(51) Int. Cl.
*G10H 7/00* (2006.01)
(52) U.S. Cl. ............................ 84/609; 84/613; 84/637; 84/649; 84/669
(58) Field of Classification Search ................ 84/609, 84/613, 637, 649, 669
See application file for complete search history.

(56) References Cited

U.S. PATENT DOCUMENTS

| | | | |
|---|---|---|---|
| 5,347,083 A * | 9/1994 | Suzuki et al. ................. | 84/613 |
| 5,440,756 A * | 8/1995 | Larson ........................ | 704/278 |
| 5,521,323 A * | 5/1996 | Paulson et al. ............... | 84/610 |
| 5,760,325 A | 6/1998 | Aoki .......................... | 84/613 |
| 5,763,802 A | 6/1998 | Aoki et al. ................... | 84/613 |
| 5,913,259 A * | 6/1999 | Grubb et al. ................. | 84/610 |
| 6,057,502 A * | 5/2000 | Fujishima .................... | 84/637 |
| 6,107,559 A * | 8/2000 | Weinstock et al. ............ | 84/634 |
| 6,166,314 A * | 12/2000 | Weinstock et al. ......... | 84/483.1 |
| 6,380,474 B2 * | 4/2002 | Taruguchi et al. ............ | 84/612 |

FOREIGN PATENT DOCUMENTS

| | | |
|---|---|---|
| JP | 6-290574 | 10/1994 |
| JP | 10-134549 | 5/1998 |

* cited by examiner

*Primary Examiner*—Lincoln Donovan
*Assistant Examiner*—David S. Warren
(74) *Attorney, Agent, or Firm*—Drinker Biddle & Reath LLP

(57) ABSTRACT

An apparatus and a method for searching for a music piece which includes a storing device for storing first chord progression music data for a plurality of music pieces representing chronological changes in chords in the music pieces. Second chord progression music data representing chronological changes in at least a part of chords in a music piece is produced, the first chord progression music data for the plurality of music pieces stored and the second chord progression music data are compared on the basis of the amount of change in the root of a chord in a chord transition and the attribute of the chord after the transition in order to calculate a similarity for each of the plurality of music pieces, and a search output corresponding to a result of the calculation for each of the plurality of music pieces is produced.

9 Claims, 16 Drawing Sheets

FIG.3

| A  | 1.0          |
|----|--------------|
| A# | A × 1.059163 |
| B  | A × 1.124622 |
| C  | A × 1.189207 |
| C# | A × 1.259921 |
| D  | A × 1.334840 |
| D# | A × 1.414214 |
| E  | A × 1.498307 |
| F  | A × 1.587401 |
| F# | A × 1.681793 |
| G  | A × 1.781797 |
| G# | A × 1.887749 |
| A  | A × 2.0      |

A+C+E♭+F#(Adim7)
→ A+C+E♭(Adim7 CANDIDATE) | C+E♭+F#(Cdim7 CANDIDATE)

A+C#+E+G(A7)
→ A+C#+E(A) | A+C#+G(A7 CANDIDATE) | C#+E+G(C#dim7 CANDIDATE)

```
TIME (4 BYTES) 1ST CHORD CANDIDATE (1 BYTE) 2ND CHORD CANDIDATE (1 BYTE)
TIME (4 BYTES) 1ST CHORD CANDIDATE (1 BYTE) 2ND CHORD CANDIDATE (1 BYTE)
                                    ⋮
TIME (4 BYTES) 1ST CHORD CANDIDATE (1 BYTE) 2ND CHORD CANDIDATE (1 BYTE)
```

FIG.9A

| FUNDAMENTAL TONE | |
|---|---|
| A | 0 × 00 |
| A# | 0 × 01 |
| B | 0 × 02 |
| C | 0 × 03 |
| C# | 0 × 04 |
| D | 0 × 05 |
| D# | 0 × 06 |
| E | 0 × 07 |
| F | 0 × 08 |
| F# | 0 × 09 |
| G | 0 × 0A |
| G# | 0 × 0B |

FIG.9B

| ATTRIBUTE | |
|---|---|
| MAJOR | 0 × 00 |
| MINOR | 0 × 02 |
| 7TH CANDIDATE | 0 × 01 |
| DIM 7TH CANDIDATE | 0 × 03 |

FIG.9C

ATTRIBUTE (LOWER 4 BITS) + FUNDAMENTAL TONE (LOWER 4 BITS)

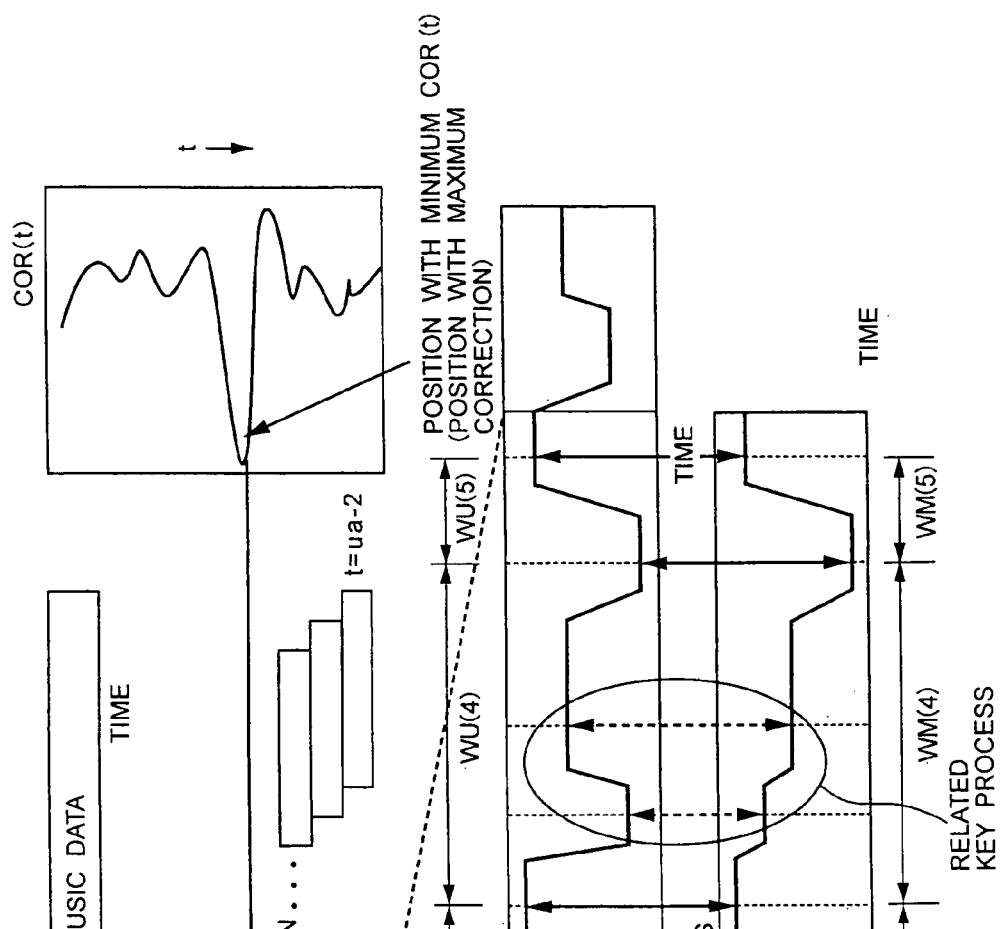
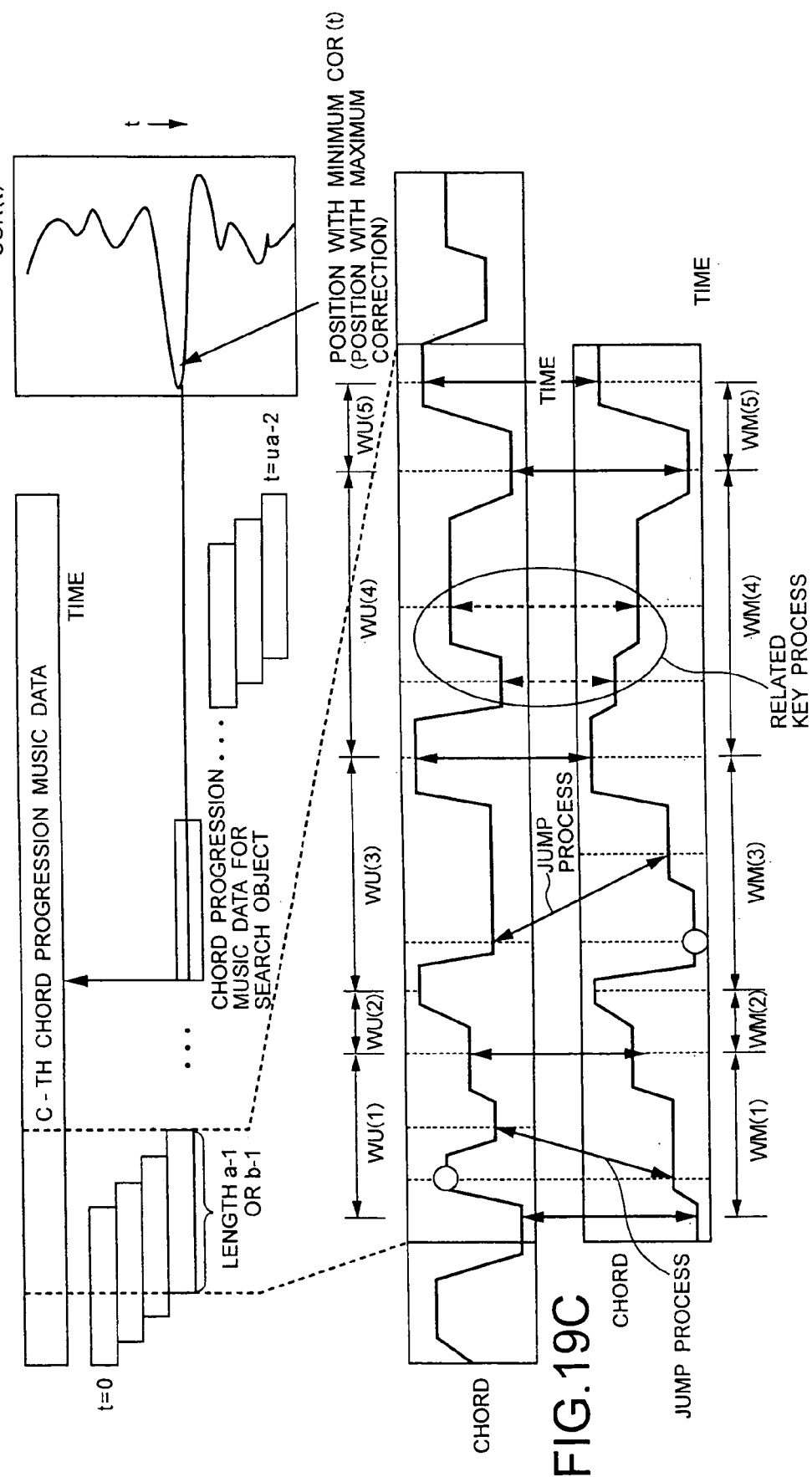

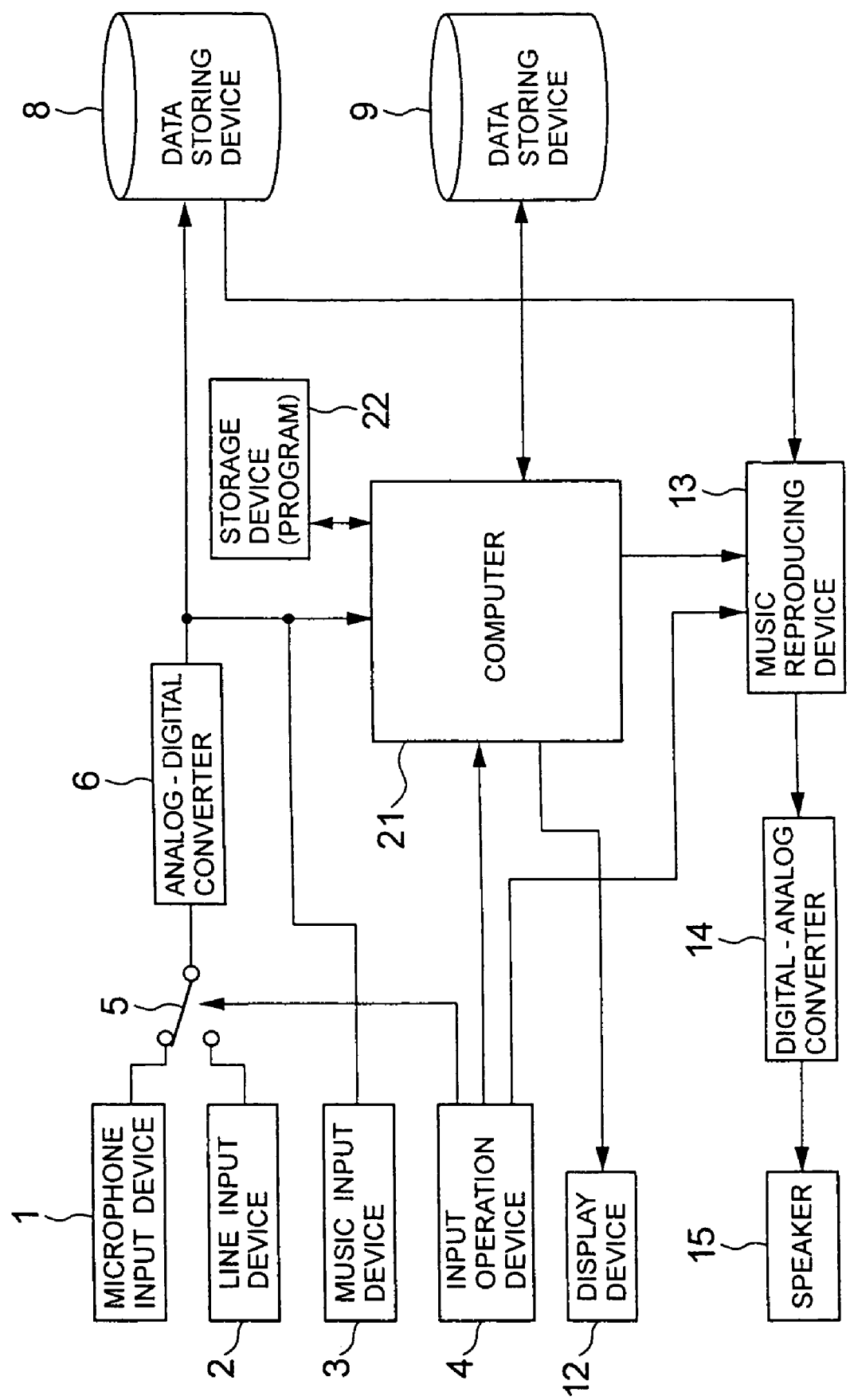

MUSIC SEARCHING APPARATUS AND METHOD

BACKGROUND OF THE INVENTION

1. Field of the Invention

The present invention relates to an apparatus and a method for searching for a music piece corresponding to music for an object of search.

2. Description of the Related Background Art

There is a case that a listener does not know the title or artist of a music pieces or a song broadcasted on TV or radio. It is necessary to acquire music information on the listened music in order to once again personally listen to the music. A music searching apparatus is known as an apparatus used to search for music information such as the title of the music piece.

In a conventional music searching apparatus, as disclosed in Japanese Patent Kokai No. H10-134549 and No. H06-290574, characteristic parameters of music such as a tempo, a musical instrument pattern, an interval, a chord for each beat, the frequency of particular chords, and a rhythm pattern are detected on the basis of music data of each music piece. The apparatus includes storage means that stores these parameter data with their indexes, and characteristic parameters are detected for a desired music piece and the indexes for the detected parameters are used as extraction indexes. Then, the extraction indexes and the stored indexes are compared with each other and information for the desired music piece is displayed on the basis of the comparison result.

However, in the conventional music searching apparatus, various kinds of characteristic parameters must be extracted for each music piece and stored in the storage means in advance in order to obtain accurate information on the desired music piece. This necessarily complicates the structure of the apparatus.

SUMMARY OF THE INVENTION

It is an object of the present invention to provide an apparatus and a method for accurately searching for a desired music piece in a simple manner.

A music searching apparatus according to the present invention, comprises: a storing device which stores first chord progression music data for a plurality of music pieces representing chronological changes in chords in the music pieces; a searching data producing device which produces second chord progression music data representing chronological changes in at least a part of chords in a music piece; a comparator which compares the second chord progression music data with the first chord progression music data for the plurality of music pieces stored in the storing device on the basis of an amount of change in a root of a chord at a chord transition and an attribute of the chord after the transition, thereby calculating a degree of similarity for each of the plurality of music pieces; and an output device which produces a search output corresponding to a result of the similarity degree calculation for each of the plurality of music pieces by the comparator.

A music searching method according to the present invention comprises the steps of: storing first chord progression music data for a plurality of music pieces representing chronological changes in chords in the music pieces; producing second chord progression music data representing chronological changes in at least a part of chords in a music piece; comparing the second chord progression music data with the first chord progression music data for the plurality of music pieces stored in the storing step on the basis of an amount of change in a root of a chord in a chord transition and an attribute of the chord after the transition, thereby calculating a degree of similarity for each of the plurality of music pieces; and producing a search output corresponding to a result of the similarity degree calculation for each of the plurality of music pieces by the comparing step.

A computer program product according to the present invention comprising a program for searching a music piece, the searching comprising the steps of: storing first chord progression music data for a plurality of music pieces representing chronological changes in chords in the music pieces; producing second chord progression music data representing chronological changes in at least a part of chords in a music piece; comparing the second chord progression music data with the first chord progression music data for the plurality of music pieces stored in the storing step on the basis of an amount of change in a root of a chord in a chord transition and an attribute of the chord after the transition, thereby calculating a degree of similarity for each of the plurality of music pieces; and producing a search output corresponding to a result of the similarity degree calculation for each of the plurality of music pieces by the comparing step.

BRIEF DESCRIPTION OF THE DRAWINGS

FIG. 3 is a table of ratios of the frequencies of twelve tones and tone A one octave higher with reference to the lower tone A as 1.0;

FIG. 7 shows how a chord with four tones is transformed into a chord with three tones;

FIG. 8 shows a recording format into a temporary memory;

FIGS. 9A to 9C show method for expressing fundamental notes of chords, their attributes, and a chord candidate;

FIGS. 19A to 19C show the relation between the C-th chord progression music data and chord progression music data for a search object, changes of a correlation coefficient COR(t), time widths for which chords are maintained, jump processes, and a related key process; and FIG. 20 is a block diagram of the configuration of a music processing system as another embodiment of the invention.

DETAILED DESCRIPTION OF THE INVENTION

Hereinafter, embodiments of the present invention will be described in detail with reference to the drawings.

Figure 1:
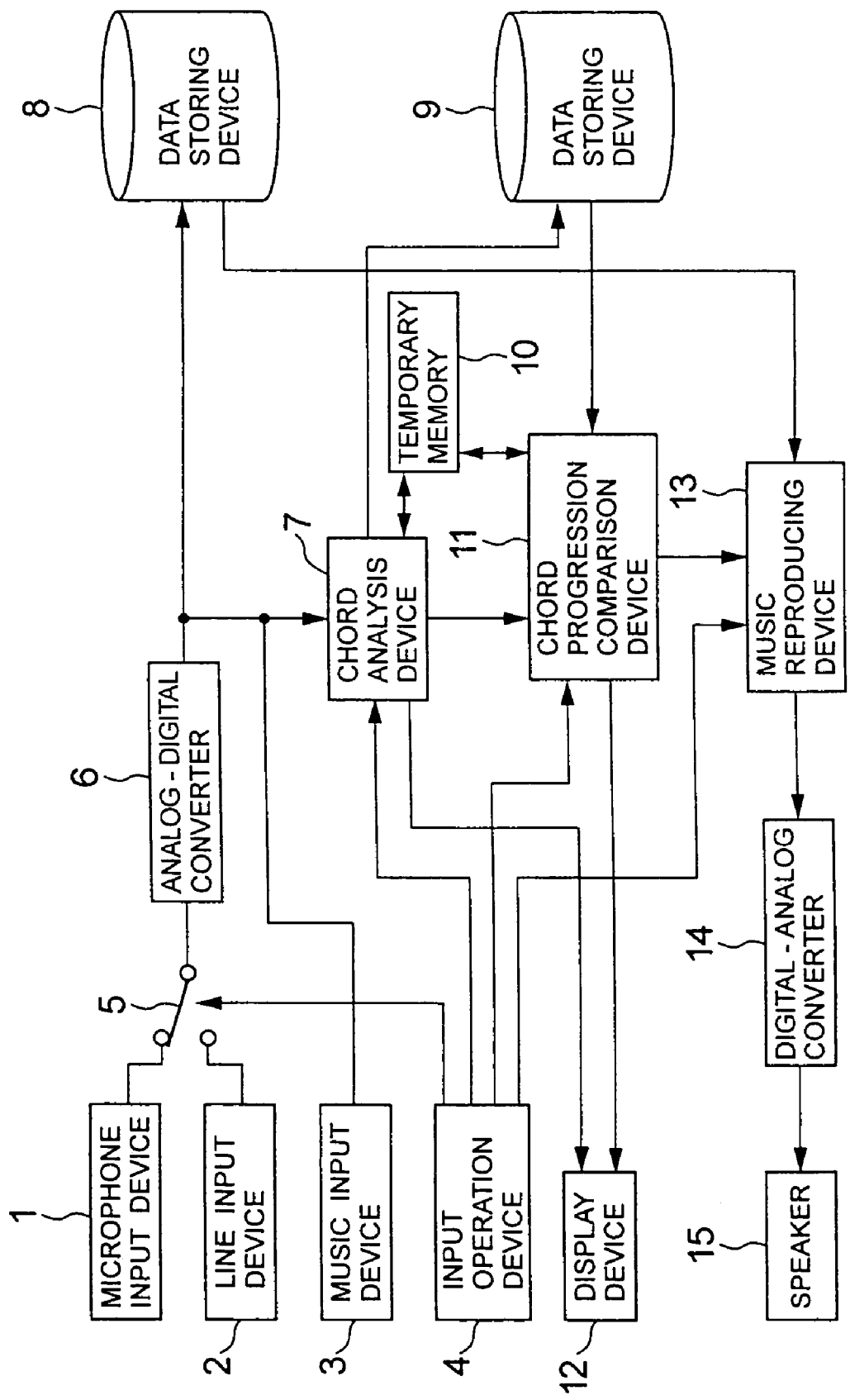
FIG. 1 is a block diagram of the configuration of a music processing system to which the invention is applied.

FIG. 1 shows a music processing system to which the present invention is applied. The music processing system includes a microphone input device 1, a line input device 2, a music input device 3, an input operation device 4, an input selector switch 5, an analog-digital converter 6, a chord analysis device 7, data storing devices 8 and 9, a temporary memory 10, a chord progression comparison device 11, a display device 12, a music reproducing device 13, a digital-analog converter 14, and a speaker 15.

The microphone input device 1 can collect a music sound with a microphone and outputs an analog audio signal representing the collected music sound. The line input device 2 is connected, for example, with a disc player or a tape recorder, so that an analog audio signal representing a music sound can be input. The music input device 3 is, for example, a CD player connected with the chord analysis device 7 and the data storing device 8 to reproduce a digitized audio signal (such as PCM data). The input operation device 4 is a device for a user to operate for inputting data or commands to the system. The output of the input operation device 4 is connected with the input selector switch 5, the chord analysis device 7, the chord progression comparison device 11, and the music reproducing device 13.

The input selector switch 5 selectively supplies one of the output signals from the microphone input device 1 and the line input device 2 to the analog-digital converter 6. The input selector switch 5 operates in response to a command from the input operation device 4.

The analog-digital converter 6 is connected with the chord analysis device 7 and the data storing device 8, digitizes an analog audio signal, and supplies the digitized audio signal to the data storing device 8 as music data. The data storing device 8 stores the music data (PCM data) supplied from the analog-digital converter 6 and the music input device 3 as files.

The chord analysis device 7 analyzes chords in accordance with the supplied music data by executing a chord analysis operation that will be described. The chords of the music data analyzed by the chord analysis device 7 are temporarily stored as first and second chord candidates in the temporary memory 10. The data storing device 9 stores chord progression music data (first chord progression music data), which is analyzed result by the chord analysis device 7, as a file for each music piece.

The chord progression comparison device 11 compares the chord progression music data (second chord progression music data) as an object of search and the chord progression music data stored in the data storing device 9, and chord progression music data with high similarities to the chord progression music data of the search object is detected. The display device 12 displays a result of the comparison by the chord progression comparison device 11 as a list of music pieces.

The music reproducing device 13 reads out the data file of the music piece detected as showing the highest similarity by the chord progression comparison device 11 from the data storing device 8, reproduces the data, and outputs as a digital audio signal. The digital-analog converter 14 converts the digital audio signal reproduced by the music reproducing device 13 into an analog audio signal.

The chord analysis device 7, the chord progression comparison device 11, and the music reproducing device 13 each operate in response to a command from the input operation device 4.

The operation of the music processing system will be described in detail below.

Here, assuming that an analog audio signal representing a music sound is supplied from the line input device 2 to the analog-digital converter 6 through the input selector switch 5, and then converted into a digital signal for supply to the chord analysis device 7, the operation is described.

The chord analysis operation includes a pre-process, a main process, and a post-process. The chord analysis device 7 carries out frequency error detection operation as the pre-process.

Figure 2:
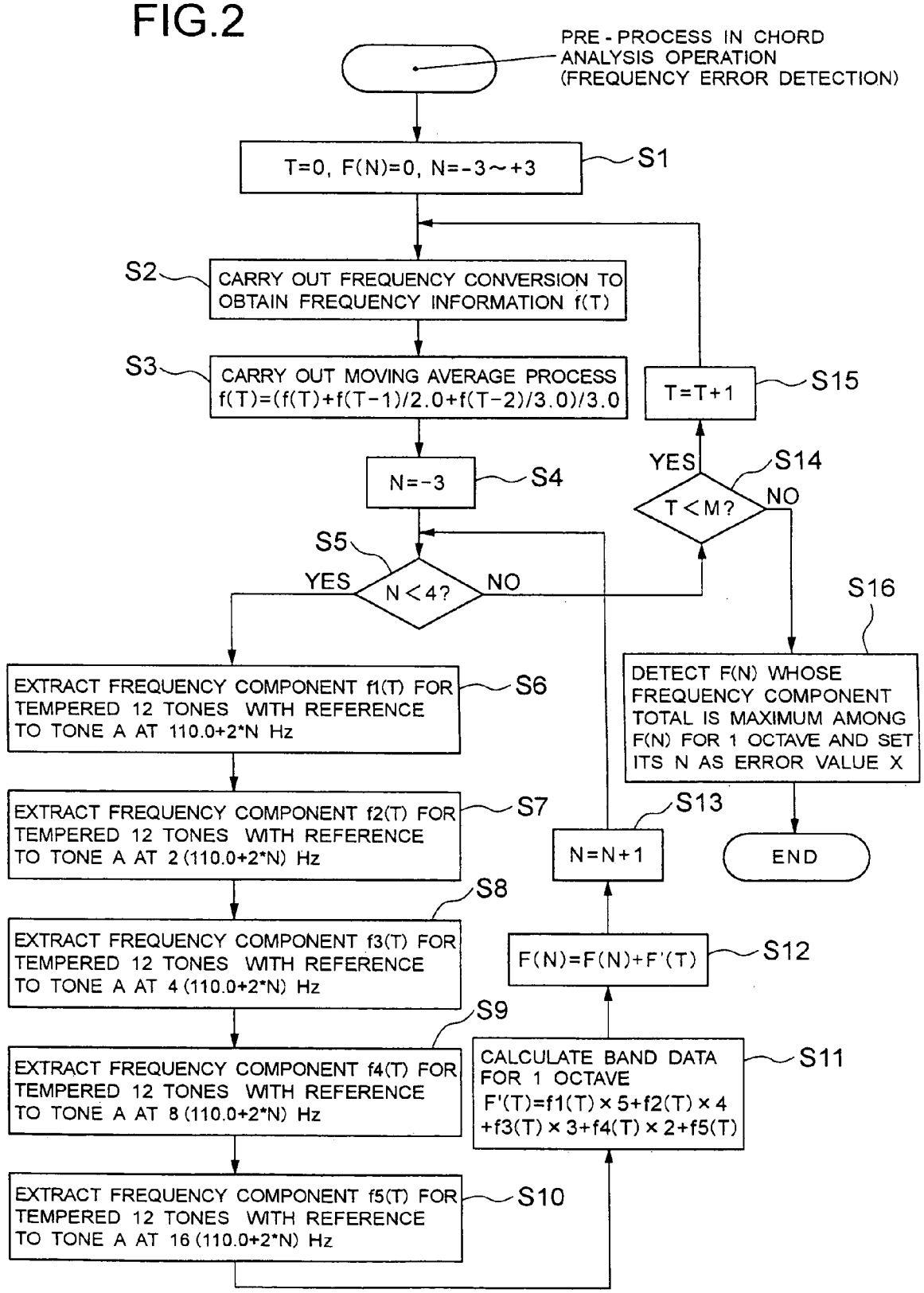
FIG. 2 is a flow chart showing the operation of frequency error detection.

In the frequency error detection operation, as shown in FIG. 2, a time variable T and a band data F(N) each are initialized to zero, and a variable N is initialized, for example, to the range from −3 to 3 (step S1). An input digital signal is subjected to frequency conversion by Fourier transform at intervals of 0.2 seconds, and as a result of the frequency conversion, frequency information f(T) is obtained (step S2).

The present information f(T), previous information f(T−1), and information f(T−2) obtained two times before are used to carry out a moving average process (step S3). In the moving average process, frequency information obtained in two operations in the past are used on the assumption that a chord hardly changes within 0.6 seconds. The moving average process is carried out by the following expression:

$$f(T)=(f(T)+f(T-1)/2.0+f(T-2)/3.0)/3.0 \tag{1}$$

After step S3, the variable N is set to −3 (step S4), and it is determined whether or not the variable N is smaller than 4 (step S5). If N<4, frequency components f1(T) to f5(T) are extracted from the frequency information f(T) after the moving average process (steps S6 to S10). The frequency components f1(T) to f5(T) are in tempered twelve tone scales for five octaves based on 110.0+2×N Hz as the fundamental frequency. The twelve tones are A, A#, B, C, C#, D, D#, E, F, F#, G, and G#. FIG. 3 shows frequency ratios of the twelve tones and tone A one octave higher with reference to the lower tone A as 1.0. Tone A is at 110.0+2×N Hz for f1(T) in step S6, at 2×(110.0+2×N) Hz for f2(T) in step S7, at 4×(110.0+2×N) Hz for f3(T) in step S8, at 8×(110.0+2×N) Hz for f4(T) in step S9, and at 16×(110.0+2×N) Hz for f5(T) in step 10.

After steps S6 to S10, the frequency components f1(T) to f5(T) are converted into band data F' (T) for one octave (step S11). The band data F' (T) is expressed as follows:

$$F'(T)=f1(T)\times 5+f2(T)\times 4+f3(T)\times 3+f4(T)\times 2+f5(T) \tag{2}$$

More specifically, the frequency components f1(T) to f5(T) are respectively weighted and then added to each other. The band data F' (T) for one octave is added to the band data F(N) (step S12). Then, one is added to the variable N (step S13), and step S5 is again carried out.

The operations in steps S6 to S13 are repeated as long as N<4 stands in step S5, in other words, as long as N is in the range from −3 to +3. Consequently, the tone component F(N) is a frequency component for one octave including tone interval errors in the range from −3 to +3.

If N≧4 in step S5, it is determined whether or not the variable T is smaller than a predetermined value M (step S14). If T<M, one is added to the variable T (step S15), and step S2 is again carried out. Band data F(N) for each variable N for frequency information f(T) by M frequency conversion operations is produced.

If T≧M in step S14, in the band data F(N) for one octave for each variable N, F(N) having the frequency components whose total is maximum is detected, and N in the detected F(N) is set as an error value X (step S16).

In the case of existing a certain difference between the tone intervals of an entire music sound such as a performance sound by an orchestra, the tone intervals can be compensated by obtaining the error value X by the pre-process, and the following main process for analyzing chords can be carried out accordingly.

Once the operation of detecting frequency errors in the pre-process ends, the main process for analyzing chords is carried out. Note that if the error value X is available in advance or the error is insignificant enough to be ignored, the pre-process can be omitted. In the main process, chord analysis is carried out from start to finish for a music piece, and therefore an input digital signal is supplied to the chord analysis device 7 from the starting part of the music piece.

Figure 4:
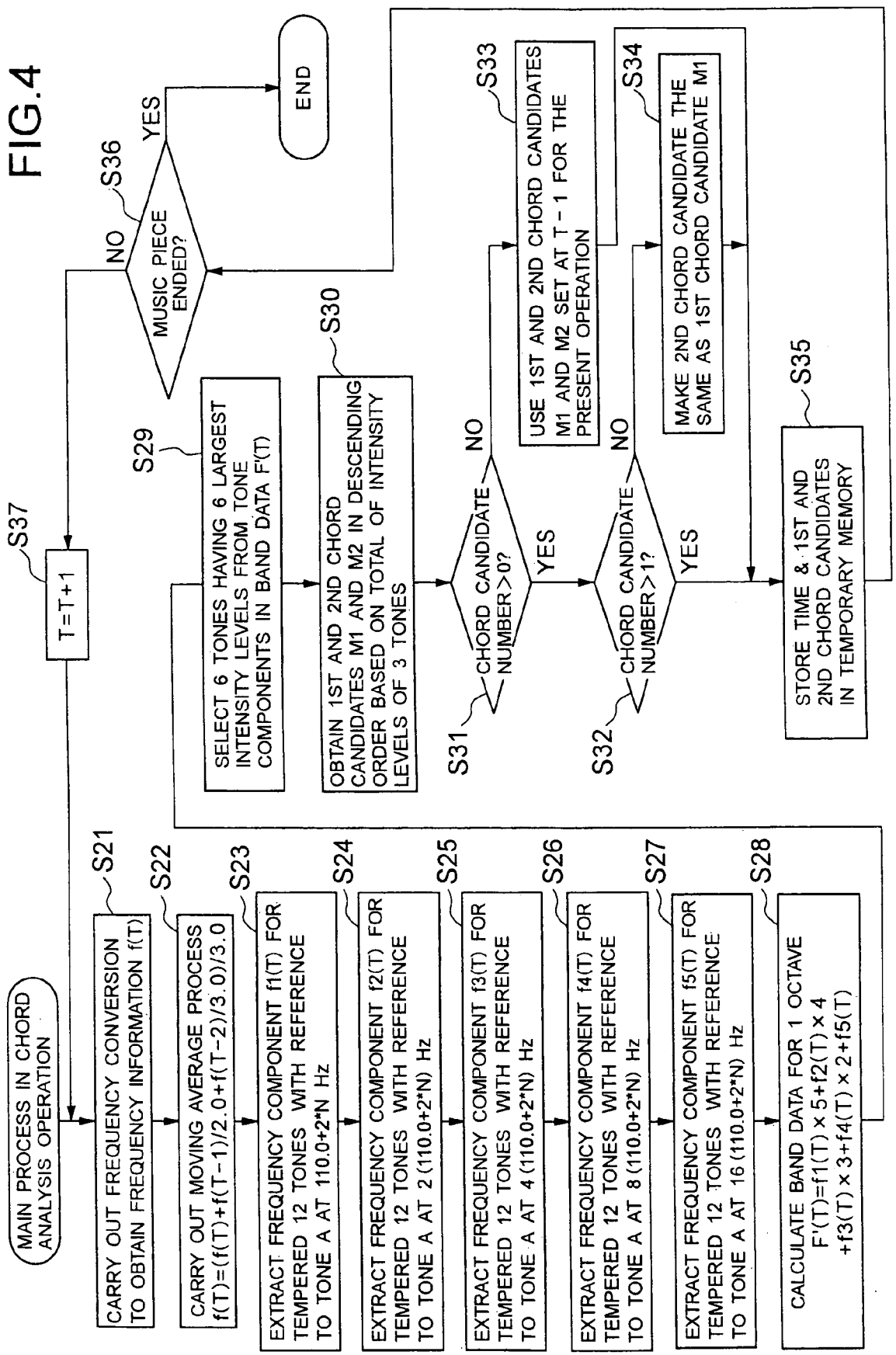
FIG. 4 is a flow chart showing a main process in chord analysis operation.

As shown in FIG. 4, in the main process, frequency conversion by Fourier transform is carried out to the input digital signal at intervals of 0.2 seconds, and frequency information f(T) is obtained (step S21). This step S21 corresponds to a frequency converter. The present information f(T), the previous information f(T−1), and the information f(T−2) obtained two times before are used to carry out moving average process (step S22). The steps S21 and S22 are carried out in the same manner as steps S2 and S3 as described above.

After step S22, frequency components f1(T) to f5(T) are extracted from frequency information f(T) after the moving average process (steps S23 to S27). Similarly to the above described steps S6 to S10, the frequency components f1(T) to f5(T) are in the tempered twelve tone scales for five octaves based on 110.0+2×N Hz as the fundamental frequency. The twelve tones are A, A#, B, C, C#, D, D#, E, F, F#, G, and G#. Tone A is at 110.0+2×N Hz for f1(T) in step S23, at 2×(110.0+2×N) Hz for f2(T) in step S24, at 4×(110.0+2×N) Hz for f3(T) in step S25, at 8×(110.0+2×N) Hz for f4(T) in step S26, and at 16×(110.0+2×N) Hz for f5(T) in step 27. Here, N is X set in step S16.

After steps S23 to S27, the frequency components f1(T) to f5(T) are converted into band data F' (T) for one octave (step S28). The operation in step S28 is carried out using the expression (2) in the same manner as step S1 described above. The band data F' (T) includes tone components. These steps S23 to S28 correspond to a component extractor.

After step S28, the six tones having the largest intensity levels among the tone components in the band data F' (T) are selected as candidates (step S29), and two chords M1 and M2 of the six candidates are produced (step S30). One of the six candidate tones is used as a root to produce a chord with three tones. More specifically, $_6C_3$ chords are considered. The levels of three tones forming each chord are added. The chord whose addition result value is the largest is set as the first chord candidate M1, and the chord having the second largest addition result is set as the second chord candidate M2.

Figure 5:
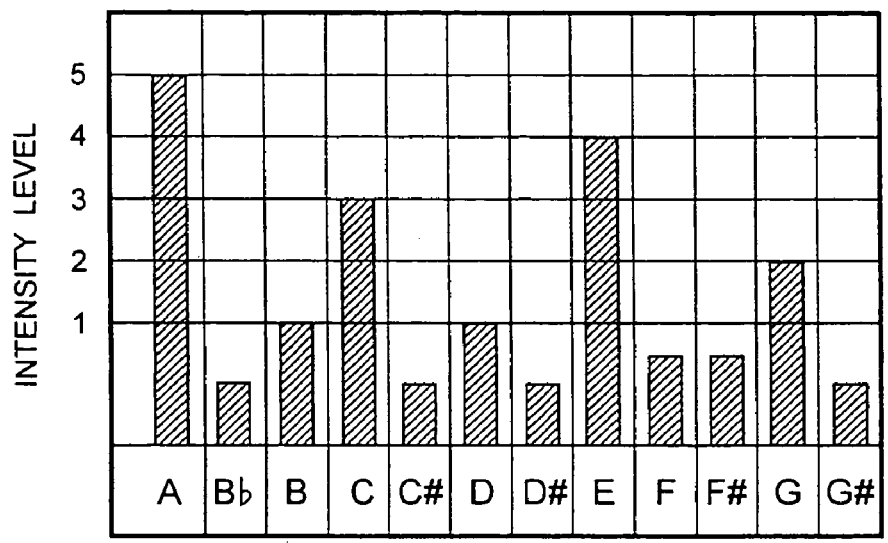
FIG. 5 is a graph showing one example of the intensity levels of tone components in band data.

When the tone components of the band data F' (T) show the intensity levels for twelve tones as shown in FIG. 5, six tones, A, E, C, G, B, and D are selected in step S29. Triads each having three tones from these six tones A, E, C, G, B, and D are chord Am (of tones A, C, and E), chord C (of tones C, E, and G), chord Em (of tones E, B, and G), chord G (of tones G, B, and D), . . . The total intensity levels of chord Am (A, C, E), chord C (C, E, G), chord Em (E, B, G), and chord G (G, B, D) are 12, 9, 7, and 4, respectively. Consequently, in step S30, chord Am whose total intensity level is the largest, i.e., 12 is set as the first chord candidate M1. Chord C whose total intensity level is the second largest, i.e., 7 is set as the second chord candidate M2.

Figure 6:
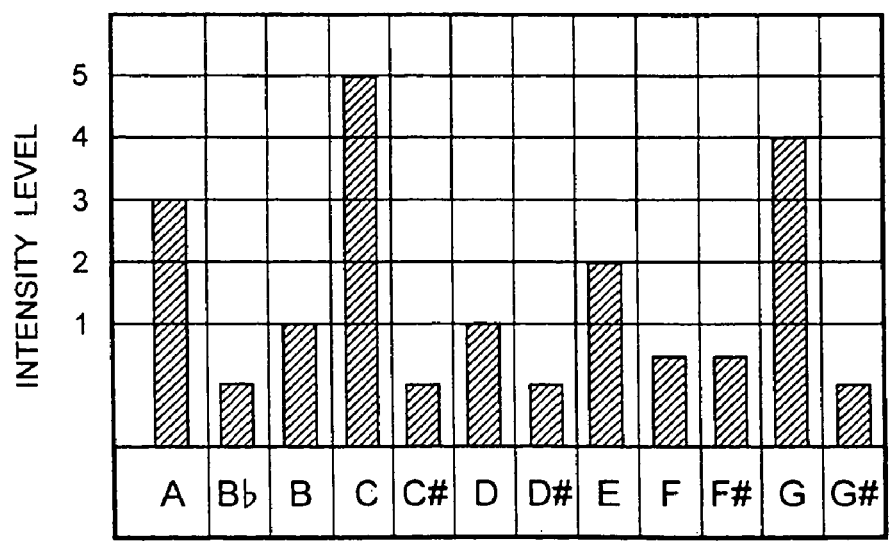
FIG. 6 is a graph showing another example of the intensity levels of tone components in band data.

When the tone components in the band data F' (T) show the intensity levels for the twelve tones as shown in FIG. 6, six tones C, G, A, E, B, and D are selected in step S29. Triads produced from three tones selected from these six tones C, G, A, E, B, and D are chord C (of tones C, E, and G), chord Am (of A, C, and E), chord Em (of E, B, and G), chord G (of G, B, and D), . . . The total intensity levels of chord C (C, E, G), chord Am (A, C, E), chord Em (E, B, G), and chord G (G, B, D) are 11, 10, 7, and 6, respectively. Consequently, chord C whose total intensity level is the largest, i.e., 11 in step S30 is set as the first chord candidate M1. Chord Am whose total intensity level is the second largest, i.e., 10 is set as the second chord candidate M2.

The number of tones forming a chord does not have to be three, and there is, for example, a chord with four tones such as 7th and diminished 7th. Chords with four tones are divided into two or more chords each having three tones as shown in FIG. 7. Therefore, similarly to the above chords of three tones, two chord candidates can be set for these chords of four tones in accordance with the intensity levels of the tone components in the band data F' (T).

After step S30, it is determined whether or not there are chords as many as the number set in step S30 (step S31). If the difference in the intensity level is not large enough to select at least three tones in step 30, no chord candidate is set. This is why step S31 is carried out. If the number of chord candidates>0, it is then determined whether the number of chord candidates is greater than one (step S32).

If it is determined in step S31 that the number of chord candidates=0, the chord candidates M1 and M2 set in the previous main process at T−1 (about 0.2 seconds before) are set as the present chord candidates M1 and M2 (step S33). If the number of chord candidates=1 in step S32, it means that only the first candidate M1 has been set in the present step S30, and therefore the second chord candidate M2 is set as the same chord as the first chord candidate M1 (step S34). These steps S29 to S34 correspond to a chord candidate detector.

If it is determined that the number of chord candidates>1 in step S32, it means that both the first and second chord candidates M1 and M2 are set in the present step S30, and therefore, time, and the first and second chord candidates M1 and M2 are stored in the temporary memory 10 (step S35). The time and first and second chord candidates M1 and M2 are stored as a set in the temporary memory 10 as shown in FIG. 8. The time is the number of how many times the main process is carried out and represented by T incremented for each 0.2 seconds. The first and second chord candidates M1 and M2 are stored in the order of T.

More specifically, a combination of a fundamental tone (root) and its attribute is used in order to store each chord candidate on a 1-byte basis in the temporary memory 10 as shown in FIG. 8. The fundamental tone indicates one of the tempered twelve tones, and the attribute indicates a type of chord such as major {4, 3}, minor {3, 4}, 7th candidate {4, 6}, and diminished 7th (dim7) candidate {3, 3}. The numbers in the braces {} represent the difference among three tones when a semitone is 1. A typical candidate for 7th is {4, 3, 3}, and a typical diminished 7th (dim7) candidate is {3, 3, 3}, but the above expression is employed in order to express them with three tones.

As shown in FIG. 9A, the 12 fundamental tones are each expressed on a 16-bit basis (in hexadecimal notation). As shown in FIG. 9B, each attribute, which indicates a chord type, is represented on a 16-bit basis (in hexadecimal notation). The lower order four bits of a fundamental tone and the lower order four bits of its attribute are combined in that order, and used as a chord candidate in the form of eight bits (one byte) as shown in FIG. 9C.

Step S35 is also carried out immediately after step S33 or S34 is carried out.

After step S35 is carried out, it is determined whether the music has ended (step S36). If, for example, there is no longer an input analog audio signal, or if there is an input operation indicating the end of the music from the input operation device 4, it is determined that the music has ended. The main process ends accordingly.

Until the end of the music is determined, one is added to the variable T (step S37), and step S21 is carried out again. Step S21 is carried out at intervals of 0.2 seconds, in other words, the process is carried out again after 0.2 seconds from the previous execution of the process.

Figure 10:
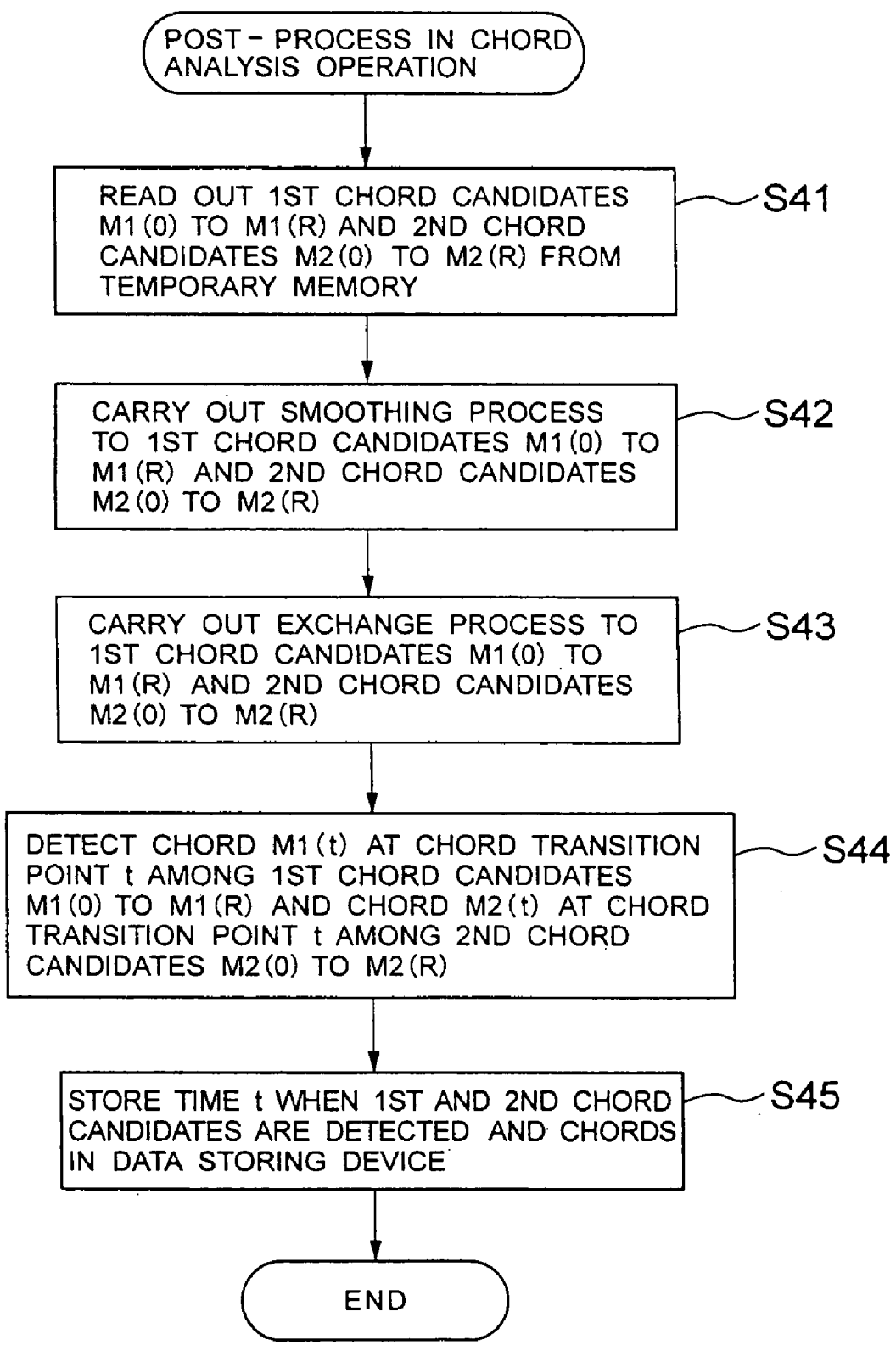
FIG. 10 is a flow chart showing a post-process in chord analysis operation.

In the post-process, as shown in FIG. 10, all the first and second chord candidates M1(0) to M1(R) and M2(0) to M2(R) are read out from the temporary memory 10 (step S41). Zero represents the starting point and the first and second chord candidates at the starting point are M1(0) and M2(0). The letter R represents the ending point and the first and second chord candidates at the ending point are M1(R) and M2(R). These first chord candidates M1(0) to M1(R) and the second chord candidates M2(0) to M2(R) thus read out are subjected to smoothing (step S42). The smoothing is carried out to cancel errors caused by noise included in the chord candidates when the candidates are detected at the intervals of 0.2 seconds regardless of transition points of the chords. As a specific method of smoothing, it is determined whether or not a relation represented by $M1(t-1) \neq M1(t)$ and $M1(t) \neq M1(t+1)$ stand for three consecutive first chord candidates M1(t−1), M1(t) and M1(t+1). If the relation is established, M1(t) is equalized to M1(t+1). The determination process is carried out for each of the first chord candidates. Smoothing is carried out to the second chord candidates in the same manner. Note that rather than equalizing M1(t) to M1(t+1), M1(t+1) may be equalized to M1(t).

After the smoothing, the first and second chord candidates are exchanged (step S43). There is little possibility that a chord changes in a period as short as 0.6 seconds. However, the frequency characteristic of the signal input stage and noise at the time of signal input can cause the frequency of each tone component in the band data F' (T) to fluctuate, so that the first and second chord candidates can be exchanged within 0.6 seconds. Step S43 is carried out as a remedy for the possibility. As a specific method of exchanging the first and second chord candidates, the following determination is carried out for five consecutive first chord candidates M1(t−2), M1(t−1), M1(t), M1(t+1), and M1(t+2) and five second consecutive chord candidates M2(t−2), M2(t−1), M2(t), M2(t+1), and M2(t+2) corresponding to the first candidates. More specifically, it is determined whether a relation represented by M1(t−2)=M1(t+2), M2(t−2)=M2(t+2), M1(t−1)=M1(t)=M1(t+1)=M2(t−2), and M2(t−1)=M2(t)=M2(t+1)=M1(t−2) is established. If the relation is established, M1(t−1)=M1(t)=M1(t+1)=M1(t−2) and M2(t−1)=M2(t)=M2(t+1)=M2(t−2) are determined, and the chords are exchanged between M1(t−2) and M2(t−2). Note that chords may be exchanged between M1(t+2) and M2(t+2) instead of between M1(t−2) and M2(t−2). It is also determined whether or not a relation represented by M1(t−2)=M1(t+1), M2(t−2)=M2(t+1), M1(t−1)=M(t)=M1(t+1)=M2(t−2) and M2(t−1)=M2(t)=M2(t+1)=M1(t−2) is established. If the relation is established, M1(t−1)=M(t)=M1(t−2) and M2(t−1)=M2(t)=M2(t−2) are determined, and the chords are exchanged between M1(t−2) and M2(t−2). The chords may be exchanged between M1(t+1) and M2(t+1) instead of between M1(t−2) and M2(t−2).

Figure 11:
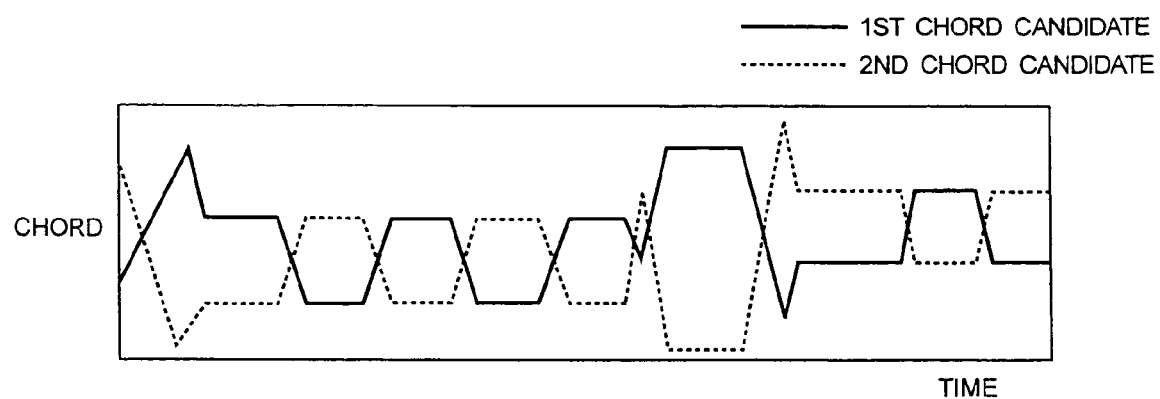
FIG. 11 shows chronological changes in first and second chord candidates before a smoothing process.
Figure 12:
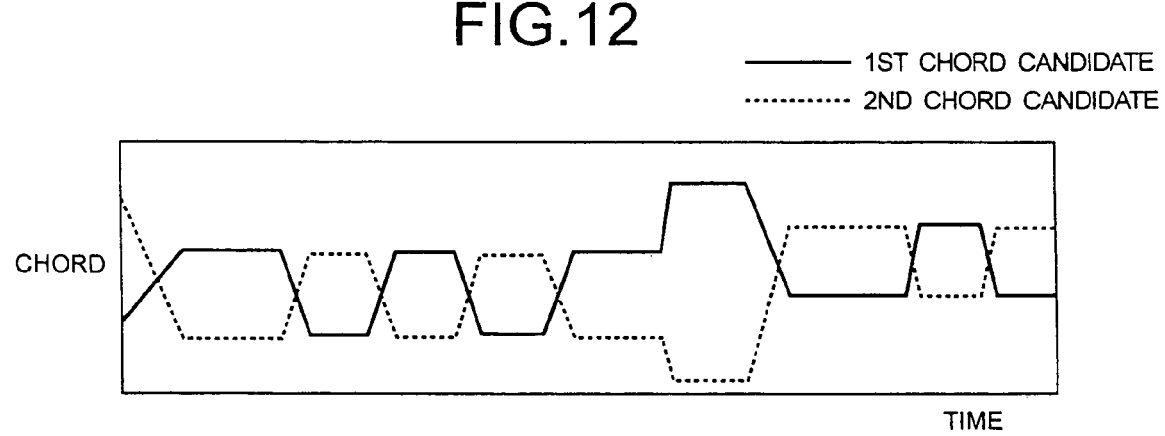
FIG. 12 shows chronological changes in first and second chord candidates after the smoothing process.
Figure 13:
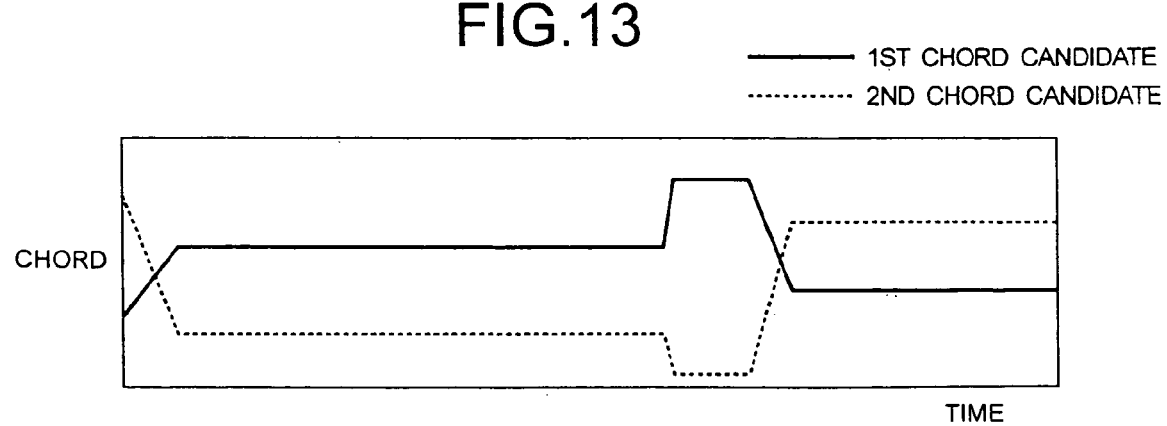
FIG. 13 shows chronological changes in first and second chord candidates after an exchanging process.

The first chord candidates M1(0) to M1(R) and the second chord candidates M2(0) to M2(R) read out in step S41, for example, change with time as shown in FIG. 11, the averaging in step S42 is carried out to obtain a corrected result as shown in FIG. 12. In addition, the chord exchange in step S43 corrects the fluctuations of the first and second chord candidates as shown in FIG. 13. Note that FIGS. 11 to 13 show changes in the chords by a line graph in which positions on the vertical line correspond to the kinds of chords.

The candidate M1(t) at a chord transition point t of the first chord candidates M1(0) to M1(R) and M2(t) at the chord transition point t of the second chord candidates M2(0) to M2(R) after the chord exchange in step S43 are detected (step S44), and the detection point t (4 bytes) and the chord (4 bytes) are stored for each of the first and second chord candidates in the data storing device 9 (step S45). Data for one music piece stored in step S45 is chord progression music data. These steps S41 to S45 correspond to a smoothing device.

Figure 14:
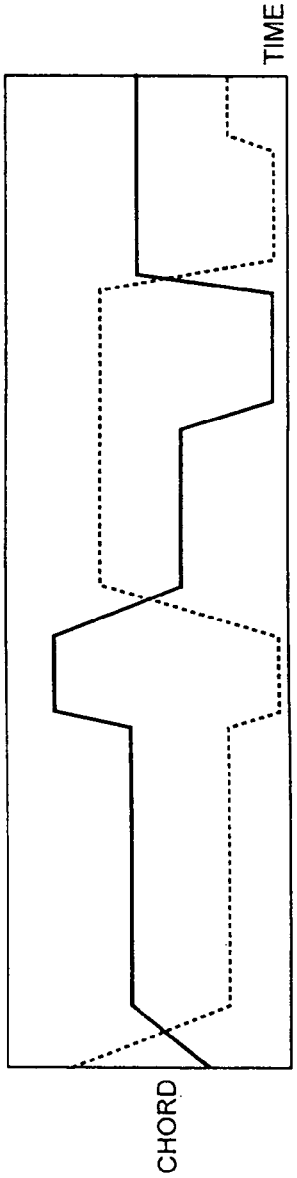
FIGS. 14A to 14D show how chord progression music data is produced and its format.

When the first and second chord candidates M1(0) to M1(R) and M2(0) to M2(R), after exchanging the chords in step S43, fluctuate with time as shown in FIG. 14A, the time and chords at transition points are extracted as data. FIG. 14B shows the content of data at transition points among the first chord candidates F, G, D, Bb (B flat), and F that are expressed as hexadecimal data 0×08, 0×0A, 0×05, 0×01, and 0×08. The transition points t are T1(0), T1(1), T1(2), T1(3), and T1(4). FIG. 14C shows data contents at transition points among the second chord candidates C, Bb, F#m, Bb, and C that are expressed as hexadecimal data 0×03, 0×01, 0×29, 0×01, and 0×03. The transition points t are T2(0), T2(1), T2(2), T2(3), and T2(4). The data contents shown in FIGS. 14B and 14C are stored together with the identification information of the music piece in the data storing device 9 in step S45 as a file in the form as shown in FIG. 14D.

The chord analysis operation as described above is repeated for analog-audio signals representing different music sounds. In this way, chord progression music data is stored in the data storing device 9 as a file for each of the plurality of music pieces. The above described chord analysis operation is carried out for a digital audio signal representing music sound supplied from the music input device 3, and chord progression music data is stored in the data storing device 9. Note that music data of PCM signals corresponding to the chord progression music data in the data storing device 9 is stored in the data storing device 8.

In step S44, a first chord candidate at a chord transition point of the first chord candidates and a second chord candidate at a chord transition point of the second chord candidates are detected. Then, the detected candidates form final chord progression music data, therefore the capacity per music piece can be reduced even as compared to compression data such as MP3, and data for each music piece can be processed at high speed.

The chord progression music data written in the data storing device 9 is chord data temporally in synchronization with the actual music. Therefore, when the chords are actually reproduced by the music reproducing device 13 using only the first chord candidate or the logical sum output of the first and second chord candidates, the accompaniment can be played to the music.

In the above described embodiment, an analog audio signal input to the line input device 2 is transformed into chord progression music data. Meanwhile, a digital audio signal output from the music input device 3 or sound by performance input to the microphone input device 1 may be transformed into chord progression music data in the same manner as the above embodiment. The digital audio signal such as PCM signal may be a signal for a compressed file such as MP3 in addition to the PCM signal. If information for the frequency range that allows frequency resolution corresponding to the frequency width of temperament in decoding a compressed file is available, the frequency transform operation such as Fourier transform can be omitted.

The music searching operation to search through the data storing device 9 for chord progression music data (second chord progression music data) corresponding to music sound input to the microphone input device 2 as an object of search will be described. The music searching operation includes a data input process and a searching/reproducing process. In the data input process, second chord progression music data is produced in accordance with input music sound. In the searching/reproducing process, a music piece for the chord progression music data of interest is searched in accordance with the chord progression music data stored in the data storing device 9 and the sound of the music piece is reproduced. The data input process is carried out by the chord analysis device 7, and the searching/reproducing process is carried out by the chord progression comparison device 11 and the music reproducing device 13.

Figure 15:
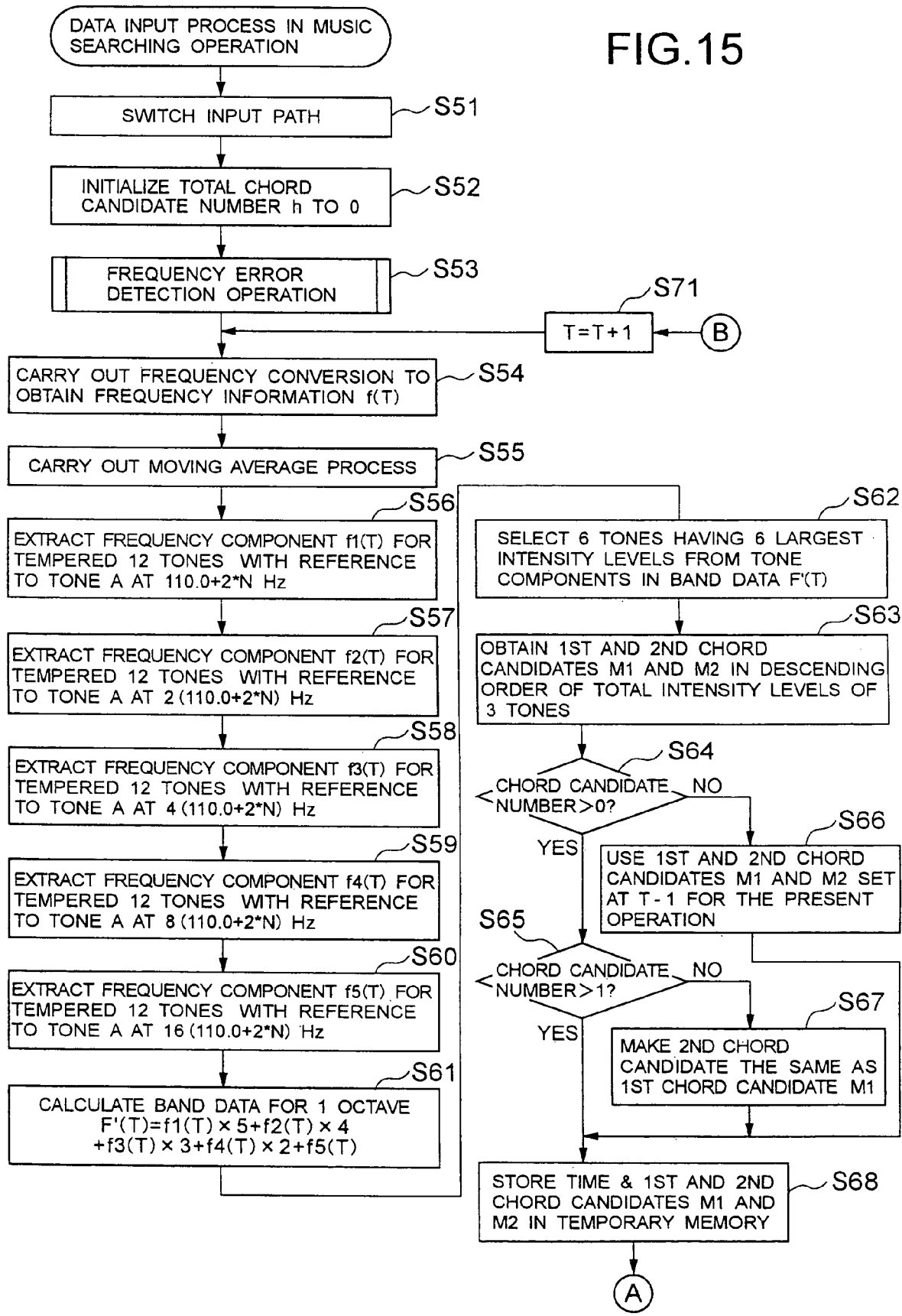
FIG. 15 is a flow chart showing a data input process in music searching operation.
Figure 16:
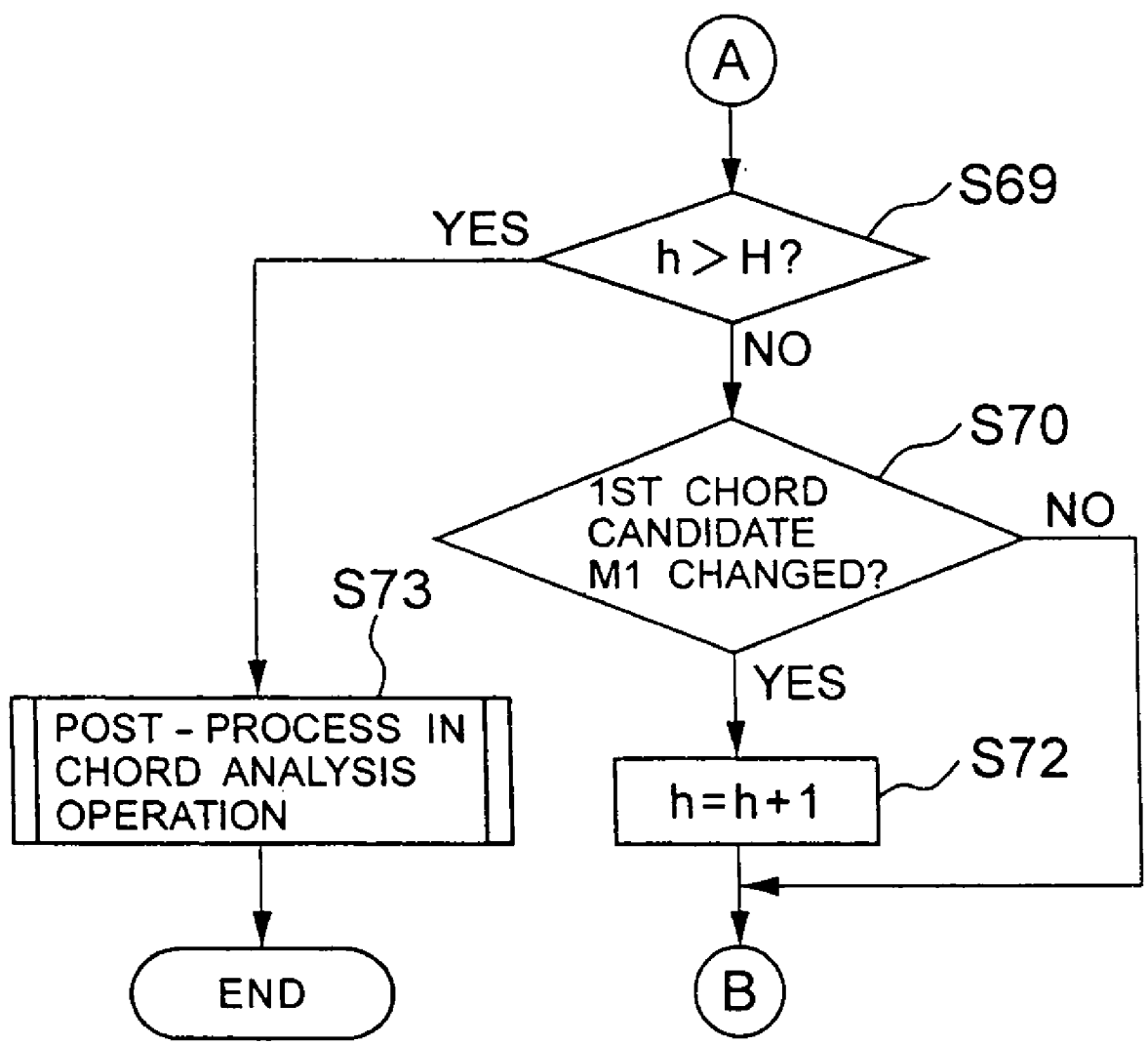
FIG. 16 is a flow chart showing the continuation of the data input process shown in FIG. 15.

In the data input process in the music searching operation, as shown in FIGS. 15 and 16, the output of the microphone input device 1 and the analog-digital converter 6 are connected by the input selector switch 5 (step S51). An analog audio signal output from the microphone input device 1 is supplied to the analog-digital converter 6 through the input selector switch 5. The analog-digital converter 6 converts the analog audio signal into a digital audio signal for supply to the chord analysis device 7. The operation in step S51 is not necessary when an audio signal from the line input device 2 is supplied to the analog-digital converter 6.

The total chord candidate number h is set to zero (step S52), and the frequency error detection operation is carried out (step S53). The frequency error detection operation is the operation in steps S1 to S16 described above.

After the frequency error detection operation, the input digital signal is subjected to frequency conversion by Fourier transform at intervals of 0.2 seconds, so that frequency information f(T) results (step S54). The present information f(T), the previous information f(T−1), and the information f(T−2) obtained two times before are used to carry out a moving average process (step S55). Frequency components f1(T) to f5(T) are extracted from the frequency information f(T) after the moving average process (steps S56 to S60). The frequency components f1(T) to f5(T) are transformed into band data F' (T) for one octave (step S61). The six tones are selected as candidates among the tone components in the band data F' (T) in the descending order of intensity levels (step S62). Two chords M1 and M2 are produced from these six tone candidates (step S63). It is then determined whether or not there are chord candidates as many as the number set in step S63 (step S64). If the chord candidate number>0, it is then determined whether the chord candidate number is greater than one (step S65). If it is determined in step S64 that the chord candidate number=0, the chord candidates M1 and M2 set at the previous T−1 (about 0.2 seconds before) are set as the present chord candidates M1 and M2 (step S66).

If it is determined that the chord candidate number=1, which means that only the first chord candidate M1 is set in the present step S63, the second chord candidate M2 is set to the same chord as the first chord candidate M1 (step S67). If it is determined in step S65 that the chord candidate number>1, the time, and first and second chord candidates M1 and M2 are stored in the temporary memory 10 (step S68).

Step S68 is also carried out immediately after steps S66 and S67 are carried out.

Steps S54 to S68 are the same as steps S21 to S35 in the main process in the chord analysis operation.

After step S68, it is determined whether or not the chord candidate total number h is greater than a predetermined number H (step S69). The predetermined number H is the number of chords necessary for searching for a music piece. If h≦H, it is determined whether the first chord candidate M1 is changed (step S70). More specifically, it is determined whether the previous chord candidate M1(t−1) and the present first chord candidate M1(t) are different. If M1(t−1)=M1(t), these chords are the same, therefore one is added to the variable T (step S71), and step S54 is carried out again. Step S54 is carried out at intervals of 0.2 seconds as described above, and therefore is carried out again after 0.2 seconds from the previous execution. If M1(t−1)≠M1(t), which means the chord is changed, one is added to the chord candidate total number h (step S72), and then step S71 is carried out.

If h>H in step S69, the post-process in the chord analysis operation is carried out (step S73). This step S73 is the same operation as steps S41 to S45 shown in FIG. 10. Steps S51 to S73 are the data input process. Consequently, the chord progression music data of interest is produced. The data includes chords as many as the predetermined number H and is not the data for the entire music piece.

The data input process corresponds to the searching data producing device.

Figure 17:
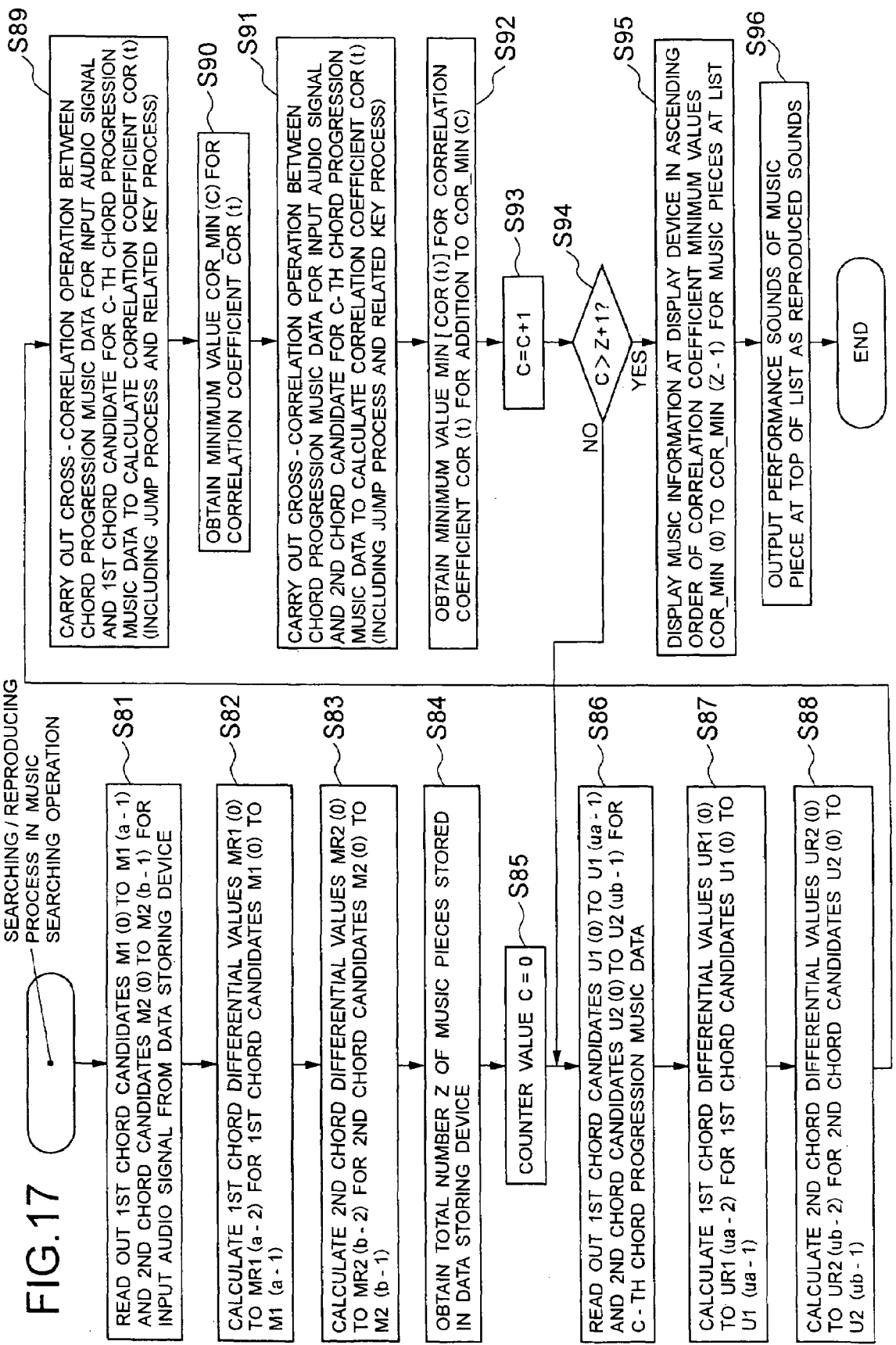
FIG. 17 is a flow chart showing a searching/reproducing process in the music searching operation.

After the data input process, the searching/reproducing process in the music searching operation is carried out. In the searching/reproducing process, as shown in FIG. 17, first chord candidates M1(0) to M1(a−1) and second chord candidates M2(0) to M2(b−1) for an audio signal for the input music sound are read out from the data storing device 9 serving as the storing device (step S81). The letter a represents the total number of the first chord candidates, and b represents the total number of the second chord candidates. First chord differential values MR1(0) to MR1(a−2) are calculated for the read out first chord candidates M1(0) to M1(a−1) (step S82). The first chord differential values are calculated as MR1(0)=M1(1)−M1(0), MR1(1)=M1(2)−M1(1), . . . , and MR1(a−2)=M1(a−1)−M1(a−2). In the calculation, it is determined whether or not the first chord differential values MR1(0) to MR1(a−2) are each smaller than zero, and 12 is added to the first chord differential values that are smaller than zero. Chord attributes MA1(0) to MA1(a−2) after chord transition are added to the first differential values MR1(0) to MR1(a−2), respectively. The second chord differential values MR2(0) to MR2(b−2) are calculated for the read out second chord candidates M2(0) to M2(b−1) (step S83). The second chord differential values are calculated as MR2(0)=M2(1)−M2(0), MR2(1)=M2(2)−

M2(1), . . . , MR2(b−2)=M2(b−1)−M2(b−2). In the calculation, it is determined whether or not the second chord differential values MR2(0) to MR2(b−2) are each smaller than zero, and 12 is added to the second chord differential values that are smaller than zero. Chord attributes MA2(0) to MA2(b−2) after the chord transition are added to the second differential values MR2(0) to MR2(b−2), respectively. Note that values shown in FIG. 9B are used for the chord attributes MA1(0) to MA1(a−2), and MA2(0) to MA2(b−2).

Figure 18:
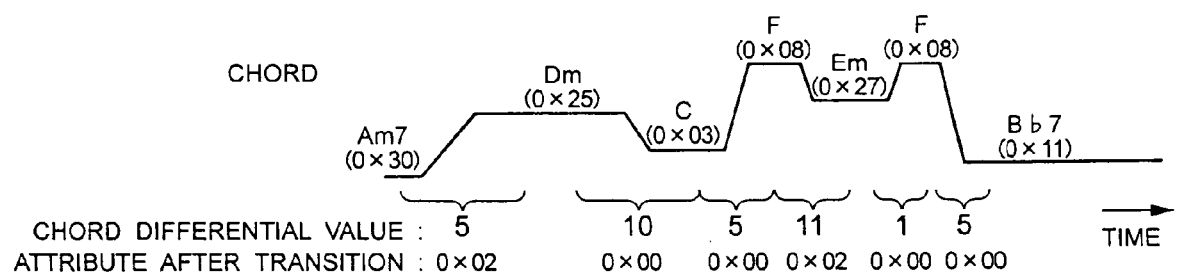
FIG. 18 shows a chord differential value for a chord transition and the attribute of the chord after the transition.

FIG. 18 shows an example of the operation in steps S82 and S83. More specifically, when the chord candidates are in a row of Am7, Dm, C, F, Em, F, and Bb#, the chord differential values are 5, 10, 5, 11, 1, and 5, and the chord attributes after transition are 0×02, 0×00, 0×00, 0×02, 0×00, and 0×00. Note that if the chord attribute after transition is 7th, major is used instead. This is for the purpose of reducing the amount of operation because the use of 7th hardly affects the result of comparison.

After step S83, the total number of music pieces stored in the form of the chord progression music data in the data storing device 9 is obtained as Z (step S84), and the counter value C is initialized to zero (step S85).

The first and second chord candidates for the C-th chord progression music data are read out from the data storing device 9 as U1(0) to U1(ua−1) and U2(0) to U2(ub−1), respectively (step S86). In the above, ua represents the total number of the first chord candidates for the C-th chord progression music data and ub is the total number of the second chord candidates for the C-th chord progression music data.

First chord differential values UR1(0) to UR1(ua−1) are calculated for the read out first chord candidates U1(0) to U1(ua−1) (step S87). The first chord differential values in step S87 are calculated as UR1(0)=U1(1)−U1(0), UR1(1)=U1(2)−U1(1), . . . , and UR1(ua−2)=U1(ua−1)−U1(ua−2). In the calculation, it is determined whether or not the first chord differential values UR1(0) to UR1(ua−2) are each smaller than zero, and 12 is added to the first chord differential values that are smaller than zero. Chord attributes UA1(0) to UA1(ua−2) after the chord transition are added to the first chord differential values UR1(0) to UR1(ua−2), respectively. The second chord differential values UR2(0) to UR2(ub−2) are calculated for the read out second chord candidates U2(0) to U2(ub−1), respectively (step S88). The second chord differential values are calculated as UR2(0)=U2(1)−U2(0), UR2(1)=U2(2)−U2(1), . . . , and UR2(ub−2)=U2(ub−1)−U2(ub−2). In the calculation, it is also determined whether or not the second chord differential values UR2(0) to UR2(ub−2) are each smaller than zero, and 12 is added to the second chord differential values that are smaller than zero. Chord attributes UA2(0) to UA2(ub−2) after chord transition are added to the second chord differential values UR2(0) to UR2(ub−2), respectively.

Cross correlation operation is carried out in accordance with the first chord differential values MR1(0) to MR1(a−2) and the chord attributes MA1(0) to MA1(a−2) obtained in the step S82, the second chord differential values MR2(0) to MR2(b−2) and the chord attributes MA2(0) to MA2(b−2) obtained in step S83 for the input music sound, and the first chord differential values UR1(0) to UR1(ua−2) and the chord attributes UA1(0) to UA1(ua−2) for the stored C-th chord progression music data obtained in step S87 (step S89). In the cross correlation operation, the correlation coefficient COR(t) is produced from the following expression (3). The smaller the correlation coefficient COR(t) is, the higher the similarity is.

$$COR(t) = \Sigma 10(|UR1(t+n)-MR1(n')|+|UA1(t+n)-MA1(n')| + |WU1(t+n+1)/WU1(t+n)-WM1(n'+1)/WM1(n')|) + \Sigma 10(|UR1(t+m)-MR2(m')|+|UA1(t+m)-MA2(m')| + |WU1(t+m+1)/WU1(t+m)-WM2(m'+1)/WM2(m')|) \quad (3)$$

where WU1(), WM1(), and WM2() are time widths for which chords are maintained, t=0 to ua−2, and Σ operations are for n=0 to a−2, n'=0 to a−2, m=0 to b−2, and m'=0 to b−2.

The correlation coefficients COR(t) in step S89 are produced as t is in the range from 0 to ua−2. In the operation of the correlation coefficient COR(t) in step S89, a jump process is carried out. In the jump process, the minimum value for UR1(t+n+n1)−MR1(n'+n2) is detected. The values n1 and n2 are each an integer in the range from 0 to 2. More specifically, as n1 and n2 are changed in the range from 0 to 2, the point where UR1(t+n+n1)−MR1(n'+n2) is minimized is detected. The value n+n1 at the point is set as a new n, and n'+n2 is set as a new n'. The minimum value for UR1(t+m+m1)−MR2(m'+m2) is detected. The values m1 and m2 are each an integer in the range from 0 to 2. More specifically, as m1 and m2 are changed in the range from 0 to 2, the point where UR1(t+m+m1)−MR2(m'+m2) is minimized is detected. The value m+m1 at the point is set as a new m, and m'+m2 is set as a new m'. Then, a correlation coefficient COR(t) is calculated according to the expression (3).

If chords after respective chord transitions at the same point in both of the chord progression music data for an object of search and the C-th chord progression music data are either C or Am or either Cm or Eb (E flat), the chords are regarded as being the same. In other words, as long as the chords after the transitions are chords of a related key, |UR1(t+n)−MR1(n')|+|UA1(t+n)−MA1(n')|=0 or |UR1(t+m)−MR2(m')|+|UA1(t+m)−MA2(m')|=0 in the above expressions stands. For example, the transform of data from chord F to major by a difference of seven degrees, and the transform of the other data to minor by a difference of four degrees are regarded as the same. Similarly, the transform of data from chord F to minor by a difference of seven degrees and the transform of the other data to major by a difference of ten degrees are treated as the same.

FIG. 19A shows the relation between the C-th chord progression music data and the chord progression music data for the search object. In the chord progression music data for the search object, the part to be compared to the C-th chord progression music data changes as t advances. FIG. 19B shows changes in the correlation coefficient COR(t).

FIG. 19C shows time widths WU(1) to WU(5) during which the chords are maintained, a jump process portion and a related key portion in a cross-correlation operation between the C-th chord progression music data and the chord progression music data for the search object. The double arrowhead lines between the C-th chord progression music data and chord progression music data of interest point the same chords. The chords connected by the inclined arrow lines among them and not present in the same time period represent chords detected by the jump process. The double arrowhead broken lines point chords of related keys.

The minimum value of the calculated correlation coefficients COR(0) to COR(ua−2) is detected as MIN[COR(t)], and is directly set as COR_MIN(C) (step S90).

The cross-correlation operation is carried out in accordance with the first chord differential values MR1(0) to MR1(a−2) and the chord attributes MA1(0) to MA1(a−2) obtained in step S82 and the second chord differential values MR2(0) to MR2(b−2) and the chord attributes MA2(0) to MA2(b−2) obtained in step S83, and the second chord differential values UR2(0) to UR2(ub−2) and the chord attributes UA2(0) to UA2(ub-2) for the stored C-th chord progression music data obtained in step S88 (step S91). In the cross-correlation operation, the correlation coefficient COR(t) is calculated by the following expression (4):

$$COR(t)=\Sigma 10(|UR2(t+n)-MR1(n')|+|UA2(t+n)-MA1(n')|\\+|WU2(t+n+1)/WU2(t+n)-WM1(n'+1)/WM1(n')|)+\Sigma 10(|UR2(t+m)-MR2(m')|+|UA2(t+m)-MA2(m')|+|WU2(t+m+1)/WU2(t+m)-WM2(m'+1)/WM2(m')|) \quad (4)$$

where WU2(), WM1(), and WM2() are time widths during which the chords are maintained, t=0 to ub-2, Σ operations are for n=0 to a-2, n'=0 to a-2, m=0 to b-2, and m'=0 to b-2.

The correlation coefficient COR(t) in step S91 is calculated as t changes in the range from 0 to ub-2. In the operation of the correlation coefficient COR(t) in step S91, the minimum value for UR2(t+n+n1)-MR1(n'+n2) is detected. The values n1 and n2 are each an integer from 0 to 2. More specifically, n1 and n2 are each changed in the range from 0 to 2, and when UR2(t+n+n1)-MR1(n'+n2) takes the minimum value, n+n1 at the point is set as a new n, and n'+n2 is set as a new n'. The minimum value for UR2(t+m+m1)-MR2(m'+m2) is detected. The values m1 and m2 are each an integer from 0 to 2. More specifically, m1 and m2 are each changed in the range from 0 to 2, and when UR2(t+m+m1)-MR2(m'+m2) takes the minimum value, m+m1 at the point is set as a new m and m'+m2 is set as a new m'. Then, the correlation coefficient COR(t) is calculated according to the expression (4).

If chords after respective chord transitions at the same point in both of the chord progression music data for the search object and the C-th chord progression music data are either C or Am or either Cm or Eb, the chords are regarded as being the same. More specifically, as long as the chords after the transitions are chords of a related key, |UR2(t+n)-MR1(n')|+|UA2(t+n)-MA1(n')|=0 or |UR2(t+m)-MR2(m')+|UA2(t+m)-MA2(m')|=0 in the above expression.

The minimum value of the calculated correlation coefficients COR(0) to COR(ub-2) is detected as MIN[COR(t)] and added to COR_MIN(C) (step S92).

After step S92, the counter value C is incremented by 1 (step S93), and it is determined whether the counter value C is greater than Z-1 in step S84 (step S94). If C≦Z-1, the correlation coefficient COR(t) has not been calculated for all the music pieces stored in the data storing device 9 as chord progression music data. Therefore, the control returns to step S86 and the operation in steps S86 to S94 described above is repeated.

If C>Z-1, the minimum correlation coefficient values COR_MIN(0) to COR_MIN(Z-1) for all the music pieces are arranged in the ascending order and music information such as music titles and file names is displayed in the form of a list at the result display device 12 (step 95). The music data of the first music piece in the list is read out from the data storing device 8 and supplied to the music reproducing device 13 (step S96). In this way, the music reproducing device 13 sequentially reproduces the supplied music data, and the data is supplied to the digital-analog converter 14 as a digital signal. The digital signal is converted into an analog audio signal in the digital-analog converter 14, and then sound reproduced in accordance with the data is output from the speaker 15. The reproduced sound is the music sound of the chord progression music data for the search object with the highest likelihood.

The searching/reproducing process in steps S81 to S94 corresponds to the comparison device for calculating similarities (correlation coefficients COR(t)), and steps S95 and S96 correspond to the output device for producing a search output.

In the music searching operation, the chord progression music data for the search object and stored chord progression music data for a plurality of music pieces are compared for the root change amount (differential value) of a chord in a transition and the attribute of the chord after the transition. Therefore, a music piece such as a cover version and a BGM (background music) version that has been arranged or modulated from the original can correctly be found by the above searching operation.

Music information such as the title or artist of a music piece used in a TV drama or a commercial message that a viewer wishes to acquire is readily available by the above-described searching operation.

Furthermore, the chord progression music data for the search object and stored chord progression music data for a plurality of music pieces are compared for the root change amount of a chord in a transition and the attribute of the chord after the transition as well as the ratio of the time lengths of the chord before and after the chord transition. In this way, the desired music can more accurately be searched and found. This is because the overall ratio of the time lengths of chords is unchanged even when the speed of the music as a whole is changed by arrangement, and the music pieces match as long as they are originally from the same music piece.

The jump process and related key process described above are carried out to eliminate the effect of extraneous noises or the frequency characteristic of an input device when input music sound is of an analog signal during the operation of the differential value before and after the chord transition. Input music sound arranged differently from music pieces stored in the data storing device 9 does not completely match a corresponding piece in the position of chords and their attributes in the chord progression data despite their substantial matching in melody. Therefore, the jump process and related key process are also carried out to remedy the situation. More specifically, if the chord progression is temporarily different, similarities can be detected in the tendency of chord progression within a constant time width, and therefore it can accurately be determined whether the music pieces arranged differently are originally from the same music. Furthermore, by the jump process and related key process, accurate similarities can be obtained in cross-correlation operations for the part other than the part subjected to these processes.

Note that in the above embodiment, the data storing devices 8 and 9 that form the database are provided in the same position as the devices such as the input devices 1 to 4, the chord analysis device 7, the chord progression comparison device 11, and the display device 12. However, the data storing devices 8 and 9 and the chord progression comparison device 11 can be provided as a server in different positions from the other devices and can be connected with a client including the devices such as the input device 1 to 4, the chord analysis device 7, and the display device 12 through a network. In this case, chord progression music data is relatively small data such as data of 5 Kbytes per music, and therefore a low speed network line can be used to search for music on the server side for music sound input on the client side, and the search result may immediately be displayed on the client side. The server may read out music data for the part corresponding to a part of music sound input on the client side from the data storing device 8 and transmit the data to the client, so that the search result may quickly be obtained on the client side.

An audio signal representing a music piece for a search object may be a signal including a video signal. The data storing device 8 may store data produced by digitizing the video signal in addition to music data, and while sound for the music found by searching is reproduced, a video image corresponding to the sound may be displayed.

FIG. 20 shows another embodiment of the invention. In the music processing system in FIG. 20, the chord analysis device 7, the temporary memory 10, and the chord progression comparison device 11 in the system in FIG. 1 are formed by a computer 21. The computer 21 carries out the above-described chord analysis operation and music searching operation according to programs stored in the storage device 22. The storage device 22 does not have to be a hard disk drive and may be a drive for a storage medium. In the case, chord progression music data may be written in the storage medium.

As in the foregoing, according to the invention, information can accurately be searched and obtained for a music piece corresponding to desired music, of a plurality of music pieces in a simple structure.

This application is based on a Japanese Patent Application No. 2002-352864 which is hereby incorporated by reference.

What is claimed is:

1. A music searching apparatus, comprising:
   a storing device which stores first chord progression music data for a plurality of music pieces representing chronological changes in chords in the music pieces;
   a data producing device which produces second chord progression music data representing chronological changes in at least a part of chords in a music piece to be searched;
   a calculator which calculates a correlation coefficient between said second chord progression music data and said first chord progression music data for said plurality of music pieces stored in said storing device on the basis of an amount of change in a root of a chord at each chord transition and an attribute indicating a type of chord after each chord transition; and
   an output device which produces a search output indicating at least one music piece of said plurality of music pieces in accordance with the correlation coefficient calculated for each of said plurality of music pieces by said calculator.

2. The music searching apparatus according to claim 1, wherein
   said calculator sequentially changes a position to start calculation for the first chord progression music data for said plurality of music pieces stored in said storing device so as to calculate the correlation coefficient between the first chord progression music data for said plurality of music pieces and said second chord progression music data.

3. A music searching apparatus comprising:
   a storing device which stores first chord progression music data for a plurality of music pieces representing chronological changes in chords in the music pieces;
   a data producing device which produces second chord progression music data representing chronological changes in at least a part of chords in a music piece to be searched;
   a comparator which compares said second chord progression music data with said first chord progression music data for said plurality of music pieces stored in said storing device on the basis of an amount of change in a root of a chord at each chord transition and an attribute indicating a type of chord after each chord transition, thereby calculating a degree of similarity for each of said plurality of music pieces;
   an output device which produces a search output indicating at least one music piece of said plurality of music pieces in accordance with a result of the similarity degree calculation for each of said plurality of music pieces by said comparator; and
   a data making portion which makes first and second chord candidates indicating in chronological order a chord for each chord transition of a music piece in accordance with an input audio signal representing the music piece, said second chord progression music data and said first chord progression music data for said plurality of music pieces stored in said storing device each having the first and second chord candidates,
   wherein said comparator compares the first and second chord candidates for said second chord progression music data with first and second chord candidates for said first chord progression music data for the plurality of music pieces stored in said storing device.

4. The music searching apparatus according to claim 3, wherein said data making portion includes:
   a frequency converter which samples an input audio signal representing a music piece at predetermined time intervals for each of said plurality of music pieces, and converts the sampled audio signal into a frequency signal representing a level for each frequency component;
   a component extractor which extracts a frequency component corresponding to each tempered tone from the frequency signal obtained by said frequency converter at said predetermined time intervals;
   a chord candidate detector which detects two chords each formed by a set of three frequency components as said first and second chord candidates, said three frequency components being higher in level than the other frequency components of the extracted frequency components; and
   a smoothing device which cancels a candidate indicating a noise component in trains of said first and second chord candidates repeatedly detected by said chord candidate detector, so that a same chord is successively arranged in at least two chord candidates including the canceled portion, to produce said first chord progression music data to be stored in said storing device.

5. The music searching apparatus according to claim 3, wherein said data producing device comprises:
   a frequency converter which samples an input audio signal representing a music piece at predetermined time intervals, and converts the sampled audio signal into a frequency signal representing a level for each frequency component;
   a component extractor which extracts a frequency component corresponding to each tempered tone from the frequency signal obtained by said frequency converter at said predetermined time intervals;
   a chord candidate detector which detects a predetermined number of sets of two chords as said first and second candidates each formed by a set of three frequency components, said three frequency components being higher in level than the other frequency components of the extracted frequency components; and
   a smoothing device which cancels a candidate indicating a noise component in trains of said first and second chord candidates repeatedly detected by said chord candidate detector, so that a same chord is successively arranged in at least two chord candidates including the canceled portion, to produce said second chord progression music data.

6. A music searching method, comprising the steps of:

storing first chord progression music data for a plurality of music pieces representing chronological changes in chords in the music pieces;

producing second chord progression music data representing chronological changes in at least a part of chords in a music piece to be searched;

calculating a correlation coefficient between said second chord progression music data and said first chord progression music data for said plurality of music pieces stored in said storing step on the basis of an amount of change in a root of a chord in a chord transition and an attribute indicating a type of chord after each chord transition; and producing a search output indicating at least one music piece of said plurality of music pieces in accordance with the correlation coefficient calculated for each of said plurality of music pieces by the calculating step.

7. A computer program embedded on a computer readable medium comprising a program for searching a music piece, said searching comprising the steps of:

storing first chord progression music data for a plurality of music pieces representing chronological changes in chords in the music pieces;

producing second chord progression music data representing chronological changes in at least a part of chords in a music piece to be searched;

calculating a correlation coefficient between said second chord progression music data with said first chord progression music data for the plurality of music pieces stored in said storing step on the basis of an amount of change in a root of a chord in a chord transition and an attribute indicating a type of chord after each chord transition; and producing a search output indicating at least one music piece of said plurality of music pieces in accordance with the correlation coefficient calculated for each of said plurality of music pieces by said calculating step.

8. A music searching apparatus comprising:

a storing device which stores first chord progression music data for a plurality of music pieces representing chronological changes in chords in the music pieces;

a data producing device which produces a second chord progression music data representing chronological changes in at least a part of chords in a music piece to be searched;

a comparator which compares said second chord progression music data with said first chord progression music data for said plurality of music pieces stored in said storing device on the basis of an amount of change in a root of a chord at each chord transition and an attribute indicating a type of chord after each chord transition, thereby calculating a degree of similarity for each of said plurality of music pieces; and an output device which produces a search output indicating at least one music piece of said plurality of music pieces in accordance with a result of the similarity degree calculation for each of said plurality of music pieces by said comparator, wherein said comparator makes a first chord differential value train indicating in chronological order the change amount in a root chord for each chord transition and a first attribute train indicating in chronological order the attribute for each chord transition, in accordance with the first chord progression music data for said plurality of music pieces, makes a second chord differential value train indicating in chronological order the change amount in a root chord for each chord transition and a second attribute train indicating in chronological order the attribute for each chord transition, in accordance with the second chord progression music data, compares the second chord differential value train with the first chord differential value train, and compares the second attribute train with the first attribute train, in order to calculate the similarity degree for each of said plurality of music pieces.

9. The music searching apparatus according to claim 8, wherein said comparator compares an n-th (wherein n is an integer larger than zero) chord differential value and chord differential values arranged before and after the n-th chord differential value of the second chord differential value train with an n-th chord differential value of the first chord differential value train, and compares an n-th attribute and attributes arranged before and after the n-th attribute of the second attribute train with an n-th attribute of the first attribute train, thereby detecting higher similarity.

* * * * *